United States Patent [19]
Röhm

[11] 4,103,914
[45] Aug. 1, 1978

[54] DRILL CHUCK

[76] Inventor: Günter Horst Röhm, Heinrich-Rohm-Str. 50, Sontheim, Fed. Rep. of Germany, 7927

[21] Appl. No.: 823,868

[22] Filed: Aug. 11, 1977

[30] Foreign Application Priority Data

Aug. 31, 1976 [DE] Fed. Rep. of Germany ....... 2639214

[51] Int. Cl.² .............................................. B23B 31/12
[52] U.S. Cl. ........................................................ 279/4
[58] Field of Search .................. 279/4 R, 1 Q, 1 DA, 279/56, 64; 408/240

[56] References Cited

U.S. PATENT DOCUMENTS

| 3,025,071 | 3/1962 | Larrad | 279/4 |
| 3,388,916 | 6/1968 | Winnen et al. | 279/4 |
| 3,647,231 | 3/1972 | Schafer | 279/4 |
| 3,721,092 | 3/1973 | Schafer | 279/4 X |

*Primary Examiner*—Othell M. Simpson
*Assistant Examiner*—Horace M. Culver
*Attorney, Agent, or Firm*—Karl F. Ross

[57] ABSTRACT

A drill chuck has a chuck body carrying a nonrotatable but axially displaceable tightening cone which displaces radially a plurality of angularly equispaced tool-engaging jaws. The tightening cone is axially shifted by a rotatable but axially fixed tightening sleeve threadedly engaging the cone and manually displaceble on the body. This sleeve is connected by a torque-responsive clutch with a rotatable and axially shiftable tightening ring with the chuck slipping after the jaws engage the workpiece to permit relative rotation of the sleeve and the ring. The sleeve and the ring are threadedly interconnected so that further rotation of the ring causes an axial displacement thereof and the ring displaces a piston which pressurizes a cylinder forming a hydraulic cushion for a working piston bearing upon the chuck jaws in the axial direction.

10 Claims, 5 Drawing Figures

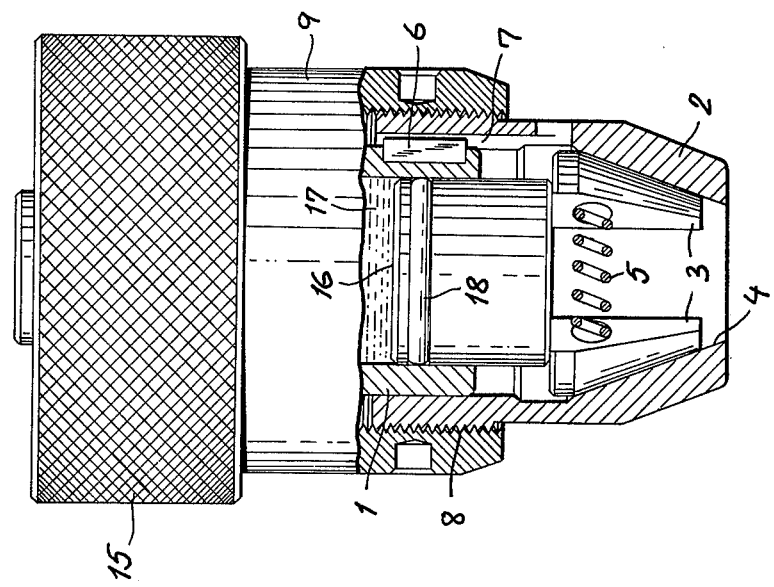
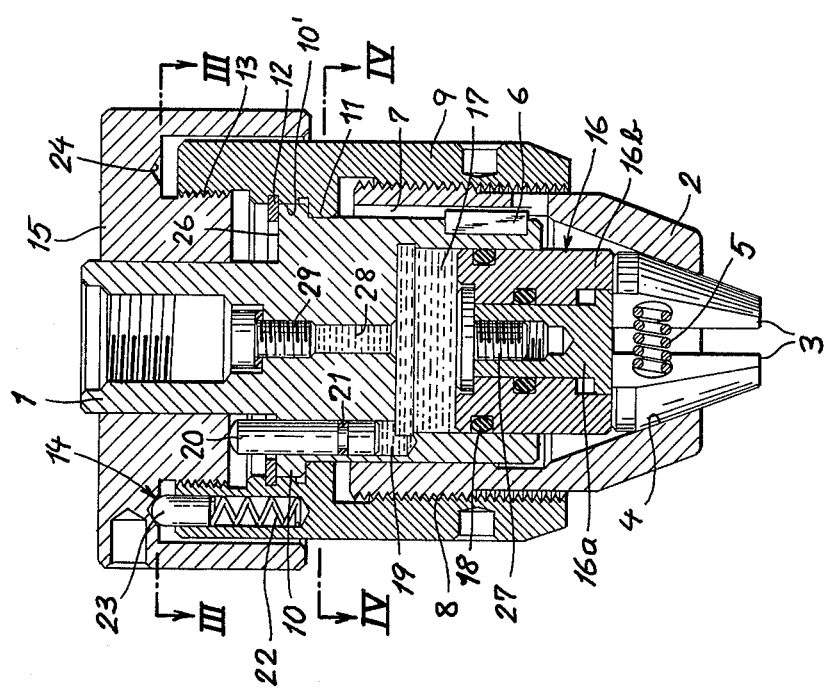

DRILL CHUCK

FIELD OF THE INVENTION

The present invention relates to a drill chuck and, more particularly, to a drill chuck of the type in which a plurality of angularly equispaced jaws are urged radially against a tool by a tightening cone which, in turn, is axially shifted by a rotatable tightening sleeve-threadedly engaging the cone and axially fixed on a chuck body.

BACKGROUND OF THE INVENTION

Chucks of the aforedescribed type have been provided heretofore in numerous configurations. With impact drills having high impact rates and high loading of the tool, however, such chucks have the disadvantage that the axial impacts upon the tool cause jamming of the chuck or release thereof. This has been found to be the case especially for so-called quick-acting chucks in which the gripping of the tool in the chuck is effected without the usual chuck key by manual rotation of a sleeve with a torque which can only be as high as that which would permit rotation of the drill spindle with the sleeve.

OBJECT OF THE INVENTION

It is the object of the present invention to provide a chuck of the aforedescribed type which retains the advantages of a rapid-tightening clutch utilizing a reduced torque application to engage the tool but which, in addition, provides an especially tight gripping of the tool even upon the application of axial impacts when, for example, the chuck is used in an impact drill.

SUMMARY OF THE INVENTION

This object and others which will become apparent hereinafter are attained, in accordance with the present invention, in a drill chuck which comprises a chuck body adapted to be mounted upon the drilling-maching spindle, e.g. via an internally threaded bore, a tightening cone axially shiftable but angularly fixed on this body, a plurality of angularly equispaced chuck jaws adapted to engage a tool, e.g. a drill bit, between them, the jaws being displaced radially into engagement with the shank of the drill bit upon axial displacement of the cone, and a tightening sleeve which threadedly engages the cone and is axially fixed on the body but is rotatable relative thereto to shift the cone.

According to an essential feature of this invention, a tightening ring is rotatable and axially shiftable on the body in addition to the sleeve and is connected therewith by a torque-limiting clutch which couples the ring with the sleeve until the jaws engage the tool, whereupon the ring is permitted to rotate relative to the sleeve which it threadedly engages. The tightening ring, upon its axial displacement relative to the body pressurizes a fluid cushion which applies fluid-pressure force axially to the jaws and hence increases the gripping action. The fluid-pressure cushion can act upon a power piston which, in turn, bears axially upon the chuck jaws within the tightening cone. According to an important feature of the invention, the chuck body is formed with a hydraulic cylinder containing a hydraulic medium which acts upon the power piston which is axially shiftable in the chuck body to bear upon the chuck jaws. The chuck body can be formed with a further cylinder, communicating with the power cylinder and referred to hereinafter as the pressurizing cylinder, in which a pressurizing piston is axially displaceable and is engaged by the aforementioned tightening ring so that its axial displacement pressurizes the power cylinder.

The torque-responsive clutch can be of the spring-loaded detent type, i.e. can include an axially displaceable element biased by a spring and urged into recesses so that slippage occurs only when the torque is sufficient to enable the ring to rotate relative to the sleeve.

While the sleeve can be provided with the pin or pins forming the aforementioned elements and the ring can be formed with the recesses receiving these pins, the kinematic reversal is possible whereby the pins are provided on the ring and the recesses on the sleeve.

The springs biasing the pins can be under precompression to determine the torque at which the ring slips past the sleeve angularly and hence causes the recesses to cam the respective pins axially against the spring force and decouple the sleeve from the ring.

According to another feature of the invention, the thread between the tightening sleeve and the tightening ring, by comparison to the thread between the tightening sleeve and the tightening cone, is a fine thread, i.e. has a greater number of threads per unit of axial length (smaller pitch).

Advantageously, moreover, both of the threads are formed internally of the tightening sleeve.

The tightening ring can then be formed with a collar which reaches axially over the edge of the tightening sleeve turned away from the tightening cone so that the tightening ring is readily manipulatable by the user.

According to still another feature of the invention, the chuck body in the region of the tightening ring can have a reduced diameter and can form an annular shoulder through which the pressurizing piston can project to engage an axial end surface of the tightening ring.

The chuck of the present invention can be provided with means for increasing the gripping force upon the delivery of impact, preferably by forming the power piston as an annular piston and a central piston. The annular piston can bear against the chuck jaws while the central piston is engaged by an end of the tool gripped by these jaws. The effective surface areas of the pistons can be then selected so that an axial impact upon the central piston will result in an oppositely effective axial force upon the chuck jaws to tighten for a corresponding period the jaws against the tool.

The advantages of the system of the present invention can be found to lie in the high force which can be generated by the pressure cushion between the tightening ring and the power piston which acts upon the chuck jaws. In other words, the high force transmission ratio between the tightening ring and the power piston which acts upon the jaws of the chuck, with limited torque upon the tightening ring generates a high clamping force upon the tool.

In spite of the high clamping force, rapid operation of the jaws of the chuck is possible via the tightening ring and the axially displaceable tightening cone. Only when the jaws of the chuck come to rest against the shank of the tool so that further displacement of the tightening cone is not possible, does the hydraulic system come into play to apply an axial force to the jaws of the chuck with further rotation of the tightening ring to increase the clamping force.

BRIEF DESCRIPTION OF THE DRAWING

The above and other objects, features and advantages of the present invention will become more readily apparent from the following description, reference being made to the accompanying drawing in which:

FIG. 1 is an axial cross-sectional view through a chuck according to the invention with the jaws in a partially closed state;

FIG. 2 is an axial cross-sectional view similar to FIG. 1 but showing the structure in another operative position, i.e. the fully opened position;

SPECIFIC DESCRIPTION

Figure 3:
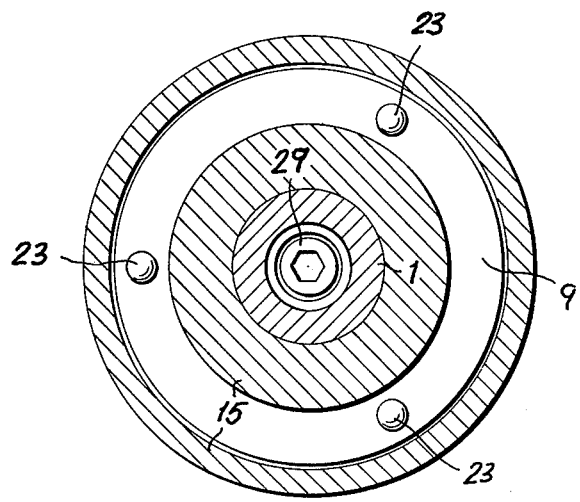
FIG. 3 is a cross-sectional view taken along the line III — III of FIG. 1.
Figure 4:
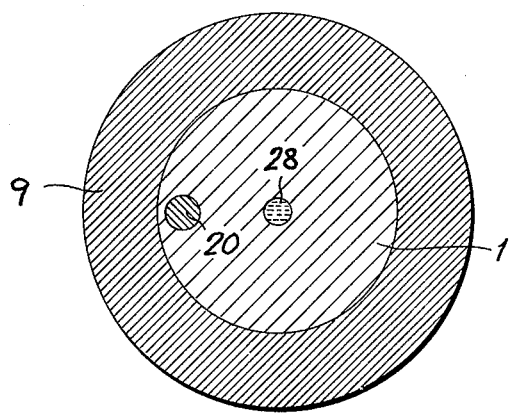
FIG. 4 is a cross-sectional view taken along the line IV — IV of FIG. 1.
Figure 5:
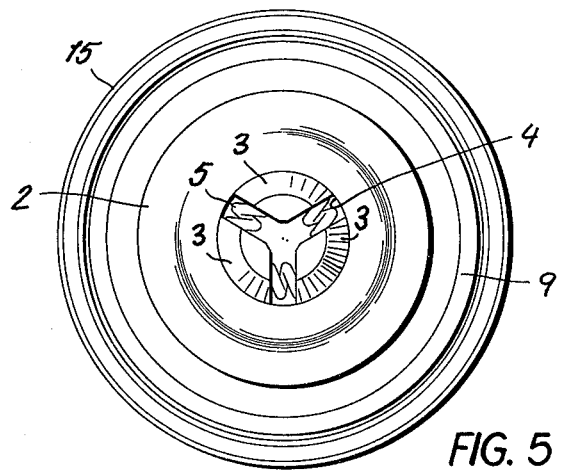
FIG. 5 is an end view of the chuck.

The chuck shown in the drawing comprises a chuck body 1 which carries a tightening cone 2 formed as an internal cone. The chuck body also carries a plurality of angularly equispaced chuck jaws 3 which can also be seen in FIG. 5.

The tightening cone is axially shiftable between the end positions illustrated in FIGS. 1 and 2 whereby the jaws 3 are displaced radially at the conical surface 4 of the tightening cone.

Since the chuck jaws 3 are supported at their axial ends, they do not change their axial positions and are merely radially displaced by this movement of the tightening cone. Between the chuck jaws 3 there are provided springs 5 which urge the chuck jaws continuously outwardly against the internal conical surface 4 of the tightening cone 2.

The tightening cone 2 is held against angular movement relative to the chuck body 1 by a key 6 which rides in a groove of the tightening cone 2 and is fitted into a recess in the chuck body 1. This key permits axial displacement of the tightening cone 2. The axial groove is represented at 7.

The tightening cone 2, moreover, is formed with an external thread which is threadedly connected, as shown at 8, with a rotatable but axially fixed tightening sleeve 9. The axial fixation of the tightening sleeve 9 is formed by an outwardly extending annular flange 10 of the chuck body 1 which fits into an annular groove 10' of the tightening sleeve 9. The annular groove 10' is formed between an internal shoulder 11 of the tightening sleeve 9 and a spring ring 12 which is lodged in a groove of the tightening sleeve.

The tightening sleeve 9 is connected by a further thread 13 and a torque-sensitive clutch generally represented at 14, with a tightening ring 15. The tightening ring 15 is rotatable and axially shiftable relative to the body 1.

The torque-responsive clutch 14 is so constructed that, upon rotation of the tightening ring 15, the tightening sleeve 9 is angularly entrained until the torque resisting this entrainment increases to a predetermined level, whereupon the clutch disengages.

The chuck jaws 3 bear axially at their upper ends (FIGS. 1 and 2) against a power piston 16 which is axially displaceable in a cylinder 17 formed in the chuck body 1. The power piston 16 carries a piston ring 18. The cylinder 17 thus forms a pressure cushion which is constituted by a hydraulic medium which can be introduced into the interior of the chuck body 1 by a filling passage 28 with a screw-type closure plug 29.

The cylinder chamber 17 is connected with a smaller cross section axially extending pressurizing cylinder 19 which is also formed axially in the chuck body 1. A pressurizing piston 20 having a piston ring 21 is axially shiftable in the cylinder 19 and bears against the tightening ring 15.

Upon axial displacement of the tightening ring 15, the piston 20 is driven downwardly (FIGS. 1 and 2) to pressurize the hydraulic fluid in the cylinder 19 and thus pressurize the hydraulic fluid in the power cylinder 17. The result is a transmission of force which is increased between the pressurizing piston and the power piston in proportion to the ratio between the cross sections of the pressurizing and power pistons. In the embodiment illustrated the force transmission ratio is determined by the ratio of the surfaces of power piston 16 to the effective surface of piston 20.

The torque-responsive clutch 15 is formed, advantageously, as a spring-loaded detent clutch. More particularly, this clutch comprises one or more detent pins 23 which are biased upwardly (FIGS. 1 and 2) by respective springs 22 into detent recesses 24 formed in the tightening ring 15. When a plurality of such recesses is provided, they are distributed along the periphery of the tightening ring. Naturally, it is also possible to provide the pins 23 with their springs 22 in the tightening ring 15 and then form the recesses 24 in the tightening sleeve 9.

The thread 13 between the tightening sleeve 9 and the tightening ring 15 is, by comparison with the thread 8 between the tightening sleeve 9 and the tightening cone 2, a fine thread which permits exact adjustment of the hydraulic tightening force.

Furthermore, both threads 8 and 13 are formed internally of the tightening sleeve 9. The tightening ring 15 has an apron or collar 25 which reaches over the upper end of the tightening sleeve 9 which is turned away from the tightening cone 2, this apron lying outwardly of the tightening sleeve 9 to facilitate manipulation by the operator.

The chuck body 1 is, in the region of the tightening ring 15, of reduced diameter and is formed with an annular shoulder 26 from which the piston 20 projects. In the embodiment illustrated, the annular shoulder 26 also serves as an abutment against which the spring ring 12 lies.

The power piston 16 is formed as a bipartite structure including an annular piston 16b and a core or central piston 16a, the two pistons being sealed relative to one another by sealing rings. The core or central piston 16a also carries a disk 27 which forms an abutment limiting the downward displacement of the central piston 16a relative to the annular piston 16d. The pistons are so dimensioned that the jaws 3 are only engaged by the annular piston 16b and not by the core piston 16a, while the tool, e.g. the shank of a drill, can engage the core piston 16a.

In operation, rotation of the tightening ring 15 initially entrains the tightening sleeve 9 via the effective torque clutch 14 so that the thread 8 is effective to axially displace the tightening cone 2 and draw the jaws 3 of the chuck against the tool. Since the tightening ring 15 is angularly entrained with the sleeve 9, the thread 13 is ineffective and the tightening ring 15 undergoes no axial displacement.

Once the chuck jaws 3 come to bear upon the shank of the tool, a further angular displacement of the tightening ring 15 will generate a torque between this tightening ring and the sleeve 9 which causes the clutch 14 to slip or disengage. Further displacement (angular) of the tightening ring brings the thread 13 into play to effect an axial displacement of the tightening ring 15 downwardly (FIGS. 1 and 2) to urge the piston 20 downwardly and compress fluid within the cylinder 19.

The fluid pressure upon the power piston 16 is thereby increased and the power piston 16b bears against the jaws 3 of the clutch to increase the tightening force.

When high axial forces are applied to the tool, e.g. upon use of the chuck in an impact drill, the upward force upon the core piston 16a further increases the pressure in the cylinder 17 and provides a downward axial force upon the annular piston 16b which again increases the tightening force.

I claim:

1. A drill chuck comprising:
    a chuck body having an axis and adapted to be fixed to a drilling machine spindle;
    a tightening cone mounted on said body for displacement axially relative thereto but angularly fixed on said body;
    a plurality of chuck jaws radially displaceable by said cone and axially aligned with said body;
    a tightening sleeve rotatable on said body but axially fixed relatively thereto and threadedly engaging said cone for axially displacing same upon angular displacement of said sleeve;
    a tightening ring rotatable and axially shiftable on said body;
    a torque-responsive clutch between said sleeve and said ring effective to couple said sleeve to said ring for joint angular displacement below a predetermined torque and to allow rotation of said ring relative to said sleeve upon the application of a torque above said predetermined torque to said ring;
    a power piston axially displaceable in said body, said body forming a power cylinder receiving said power piston, said ring being threaded onto said sleeve and said power piston bearing upon jaws for applying axial force thereto upon pressurization of said cylinder; and
    pressurizing means operated by relative axial displacement of said ring and said body for pressurizing said cylinder, said pressurizing means having a smaller cross section than that of said power piston.

2. The chuck defined in claim 1 wherein said cylinder contains a hydraulic medium and said body is formed with a pressurizing cylinder communicating with said power cylinder and a pressurizing piston axially displaceable in said pressurizing cylinder and engageable by said ring, said pressurizing cylinder and pressurizing piston forming said pressurizing means.

3. The chuck defined in claim 2 wherein said clutch is formed as a spring-loaded detent clutch having at least one spring loaded pin engageable in a recess and cammed out of said recess upon rotation of said ring by the application of a torque above said predetermined torque thereto.

4. The chuck defined in claim 3 wherein said pin is mounted in said sleeve and said recess is formed in said ring.

5. The chuck defined in claim 2 wherein the thread between said sleeve and said ring is of finer thread than the thread between said sleeve and said cone.

6. The chuck defined in claim 2 wherein both of said threads are disposed internally of said sleeve.

7. The chuck defined in claim 2 wherein said ring is formed with an apron surrounding the end of said sleeve turned away from said cone.

8. The chuck defined in claim 2 wherein said body in the region of said ring is of reduced diameter and is formed with an annular shoulder, said pressurizing piston projecting axially from said shoulder.

9. The chuck defined in claim 2 wherein said power piston is formed with an annular piston member and a central piston member axially displaceable relative to said annular piston member, said piston members being sealed relative to one another, said annular piston member only bearing against said jaws while said central piston member is engageable by the shank of a tool received in said chuck.

10. The chuck defined in claim 9 wherein said clutch comprises at least one spring-loaded pin axially displaceable in said sleeve and a recess formed in said ring and engageable by said pin, said ring having an apron surrounding at least a portion of said sleeve remote from said jaws, said threads being provided internally of said sleeve, and the thread connecting said ring with said sleeve having a finer pitch than the thread connecting said sleeve with said cone.

* * * * *